United States Patent
Tylik et al.

(10) Patent No.: US 11,347,607 B1
(45) Date of Patent: May 31, 2022

(54) DATA STORAGE CLUSTER WITH WITNESS NODE FOR SELECTING SURVIVING STORAGE NODE AFTER REPLICATION FAILURE

(71) Applicant: EMC IP Holding Company LLC, Hopkinton, MA (US)

(72) Inventors: Dmitry Nikolayevich Tylik, Westborough, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/232,292

(22) Filed: Apr. 16, 2021

(51) Int. Cl.
*G06F 11/00* (2006.01)
*G06F 11/20* (2006.01)
*G06F 13/16* (2006.01)

(52) U.S. Cl.
CPC ...... *G06F 11/2089* (2013.01); *G06F 11/2048* (2013.01); *G06F 11/2094* (2013.01); *G06F 11/2097* (2013.01); *G06F 13/1668* (2013.01); *G06F 2201/85* (2013.01)

(58) Field of Classification Search
CPC ............. G06F 11/2048; G06F 11/2089; G06F 11/2094; G06F 11/2097; G06F 11/0709; G06F 11/202–2051
See application file for complete search history.

(56) References Cited

U.S. PATENT DOCUMENTS

| | | | |
|---|---|---|---|
| 6,460,149 B1* | 10/2002 | Rowlands | G06F 11/0751 714/E11.003 |
| 6,658,595 B1* | 12/2003 | Thamattoor | G06F 11/0757 370/219 |
| 7,016,946 B2* | 3/2006 | Shirriff | G06F 11/1425 714/E11.073 |
| 7,356,728 B2 | 4/2008 | Tawil et al. | |
| 7,870,235 B2 | 1/2011 | Arendt et al. | |
| 7,890,555 B2 | 2/2011 | Gunda et al. | |
| 7,941,628 B2 | 5/2011 | Kalos et al. | |
| 9,262,229 B2 | 2/2016 | Lee et al. | |
| 9,934,089 B2 | 4/2018 | Hayes et al. | |
| 11,089,105 B1* | 8/2021 | Karumbunathan | G06F 3/067 |
| 2008/0184061 A1* | 7/2008 | Tripathi | G06F 11/1482 714/4.1 |

* cited by examiner

*Primary Examiner* — Michael Maskulinski
(74) *Attorney, Agent, or Firm* — BainwoodHuang (57) ABSTRACT

A clustered pair of data storage nodes employs a time-to-live (TTL) mechanism by which a preferred node communicates permission for continued operation to a non-preferred node. During non-errored TTL operation, host I/O requests to a data storage object are serviced, with write-type requests being replicated to the other node. Upon a failure as indicated by errored TTL operation or failure of replication, a polarization operation selects a surviving node to transition to single-node access to the data storage object. The polarization process includes: (1) each node contacting a witness node to request survivor status, (2) the witness node granting survivor status to the first node requesting it and denying survivor status to a later-requesting node, (3) at the node granted survivor status, continuing to service the host I/O requests without replication, and (4) at the other node based on being denied survivor status, discontinuing servicing of the host I/O requests.

16 Claims, 5 Drawing Sheets

DATA STORAGE CLUSTER WITH WITNESS NODE FOR SELECTING SURVIVING STORAGE NODE AFTER REPLICATION FAILURE

BACKGROUND

The invention is related to the field of data storage, and more particularly to operation of clustered data storage systems providing high availability, distributed host access to data storage objects such as volumes, files, etc.

SUMMARY

A method is disclosed of operating a clustered pair of data storage nodes, which includes employing a time-to-live (TTL) mechanism by which a preferred node of the clustered pair regularly communicates permission for continued operation to a non-preferred node of the clustered pair in response to regular TTL requests from the non-preferred node. At both the preferred node and the non-preferred node during non-errored operation of the TTL mechanism, host I/O requests to a data storage object are serviced, with write-type requests also being replicated to the other node of the clustered pair to maintain data synchronization across the clustered pair. A failure is detected as indicated by errored operation of the TTL mechanism or by failure to replicate write-type requests, and a polarization operation is performed to select a surviving node to transition to single-node access to the data storage object. The polarization process includes: (1) at each of the nodes, contacting a third witness node to request survivor status, (2) at the witness node, granting survivor status to the first node requesting it and denying survivor status to a later-requesting node, (3) at the node granted survivor status, continuing to service host I/O requests to the data storage object without replicating write-type requests to the other node, and (4) at the other node based on being denied survivor status, discontinuing servicing of host I/O requests to the data storage object. The technique allows for the non-preferred node to be the surviving node in certain failure conditions, improving availability of the cluster.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Consider an active/active arrangement in which two data storage systems present a single data storage object such as a volume. The volume data is available through paths going to both systems, which may be referred to as "System A" and "System B". Every write to A is replicated to B synchronously, and similarly, every write to B is replicated to A, synchronously. The two systems maintain a cluster between them via a Time to Live (TTL) mechanism, where one system (preferred) grants TTL to its peer (non-preferred). In this basic, TTL-only arrangement, the non-preferred system lives at the mercy of the preferred system, and once its TTL expires it goes offline. In the case of a failure the non-preferred always becomes unavailable (due to expiration of its TTL), and if any node survives it is the preferred.

Once one of the systems cannot replicate a write, it is required to break the cluster, make one of the systems unavailable, and continue I/O processing on only the surviving system. As indicated above, in the 2-node, TTL-only arrangement, the survivor (if any) is always preferred. The TTL mechanism is used to guarantee that no "split brain" situation occurs, i.e., the situation in which both systems are processing host I/Os (Reads and Writes) but no replication is occurring. Using TTL, once one system cannot replicate to its peer, TTL request/grant stops and the non-preferred eventually becomes unavailable. At that point, preferred is allowed to service I/O, and to process writes without replicating them to its peer.

There are conditions in which it is possible and desirable for the non-preferred system to survive and continue processing host I/O requests, while the preferred system is made unavailable. A simple example is the complete failure of the preferred system. Using the above TTL-only approach, in such a scenario there is no surviving system, because the non-preferred does not receive refreshed TTL and thus can no longer operate once its TTL expires. To improve availability by allowing for the non-preferred system to survive when possible, a disclosed approach employs a separate "witness node" and simple protocol that essentially overrides the TTL mechanism when the non-preferred is still available to provide single-node access to a storage volume after a failure.

In brief summary, once TTL grant requests (or responses) are not being transferred on the replication link between the systems, one or both systems will see their TTL timer expiring. When a system's timer expires, the system stops servicing I/Os and starts queuing I/Os. It also invokes a process to resolve which of the two systems should survive, which is based on communicating with the witness node. If only one of the systems has connectivity to the witness node, it's a strong indication that the other system has been isolated (perhaps in a data center failure), and the system with the connectivity should prevail. If both arrays have connectivity to the witness, the preferred should be preferred to win. These outcomes are realized by a simple witness-based protocol, namely, that the first system to contact the witness node after a failure is granted survivor status, and any later request from another system is denied. This logic is coupled with an asymmetric delay so that the outcome favors the preferred if it is still operating, while also enabling the non-preferred to survive when the failure is such that the preferred cannot contact the witness node.

Description of Embodiments

Figure 1:
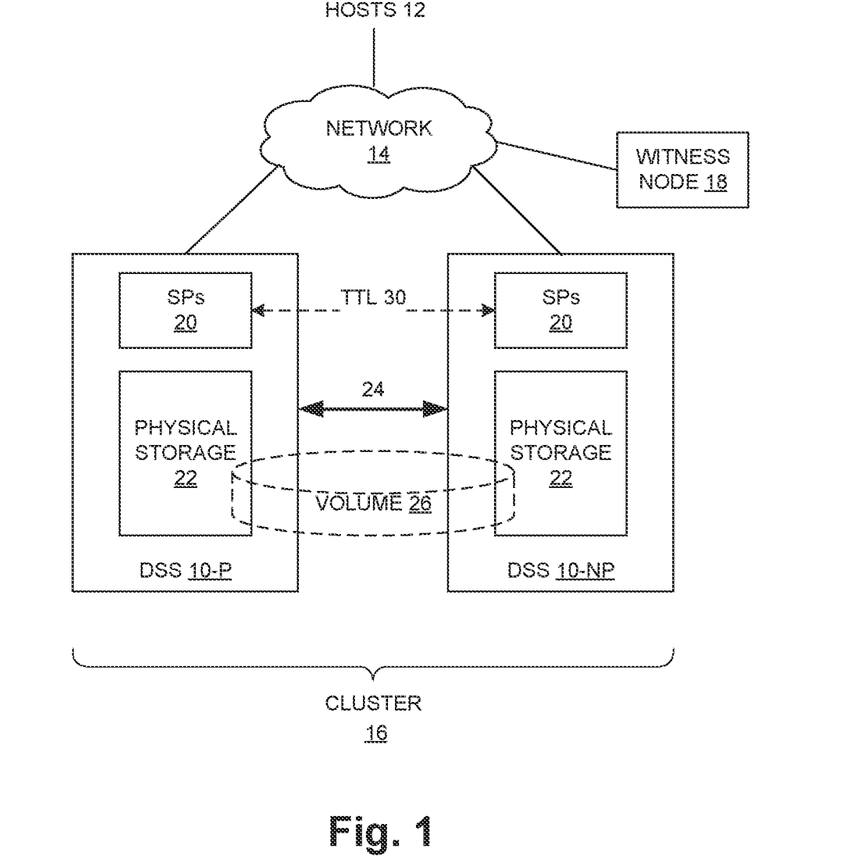
FIG. 1 is a block diagram of a data processing system with clustered data storage systems providing access to a stretched volume.

FIG. 1 shows a data processing system having a plurality of data storage systems (DSSs) 10 and host computers (HOSTS) 12 functionally coupled by one or more data communications networks 14. The DSSs 10 constitute a clustered storage system 16, also referred to as a "cluster" herein. In the cluster 16, the DSSs 10 are designated as "preferred" 10-P and "non-preferred" 10-NP, which reflects their roles in a TTL mechanism as described more below. The system also includes a computerized device referred to as a "witness node" 18. The DSSs 10, which are also referred to as "storage nodes", "nodes", and "arrays" herein, include respective storage processors (SPs) 20 and physical storage 22. Each storage processor 20 includes processors, memory and interface logic enabling it to execute storage related functionality using the associated physical storage 22 for underlying actual data storage, i.e., processing host I/O requests (reads and writes) from the hosts 12. The physical storage 22 may be realized by known secondary storage technology such as magnetic disk, Flash memory, etc.

As shown, the system further includes one or more replication links 24 between the DSSs 10, which may be distinct physical links or logical links carried via the network 14. For ease of reference the singular "replication link" is used in this description. Also shown is a logical volume 26 that can be accessed by the hosts 10 via both the DSSs 10, under normal operating conditions. In one embodiment the cluster 16 is a high-availability cluster whose nodes/DSSs 10 reside in different physical locations, such as different buildings of a campus or across some other limited geographic area (e.g., tens of miles). The volume 26 may be referred to as a "stretched" volume, referring to its logical presence on such physically separated DSSs 16. In normal operation, each DSS 10 services host I/O requests to the volume 26, which includes replicating write-type requests to the other DSS 16 via the replication link 24. Although the present description is based on access to a volume 26 specifically, it will be appreciated that the disclosed technique may be used with other types of data storage objects such as files, containers, etc.

Also shown is a special logical session referred to as "time to live" or TTL 30, which is used as part of protection against failure, and in particular to protect against the so-called "split brain" problem in which one DSS 10 is modifying its local copy of the volume 26 without such modifications also being made on the other DSS 10, resulting in data corruption. Using TTL 30, one DSS 10 ("preferred") regularly grants permission for continued operation to the other DSS 10 ("non-preferred"), so that both DSSs 10 provide host access to the volume 26 as long as this permission stays in effect. Under various failure conditions, the TTL mechanism 30 either fails itself (signifying the failure) or it is used in a manner that signals a separately detected failure from one DSS 10 to the other (i.e., by stopping the requesting or granting of permission). Additional details are given below. As also explained below, the witness node 18 is also involved in processing during failure conditions, namely in helping select a DSS 10 which is to survive a failure and provide sole, single-node access to the volume 26 to the exclusion of the other DSS 10. Because of the protection function of the witness node 18, it is preferably in a different fault domain than either of the DSSs 10, e.g. in a different building or other physical location to improve its availability when there is a failure affecting one or both DSSs 10 or the replication link 24.

Figure 2:
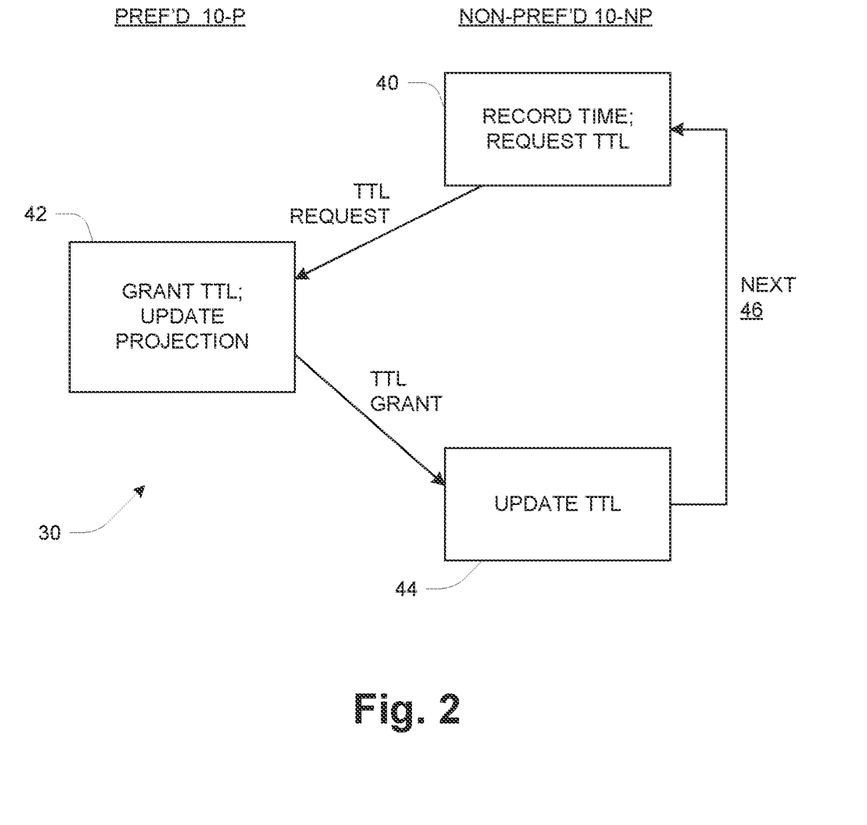
FIG. 2 is a messaging and flow diagram of basic operation of a time-to-live (TTL) mechanism.

FIG. 2 illustrates the essential operation of the TTL mechanism 30, in the form of a combination flow diagram and messaging diagram between a preferred DSS (Pref'd) 10-P and a non-preferred DSS (Non-Pref'd) 10-NP. Preferred and Non-Preferred statuses may be assigned by configuration data or system management activity preceding the illustrated operation. The assignment may be arbitrary or it may be based on some relevant substantive difference between the DSSs 10. Overall, operation is a succession of short loops based on a short timer (e.g., one second) at the non-preferred DSS 10-NP. A given iteration starts at 40 where the non-preferred DSS 10-NP records its local time and sends a TTL request message to the preferred DSS 10-P, requesting a new TTL period of ongoing operation. The duration of the TTL period is typically fixed and is some amount greater than the repetition period of the process, such as 5 seconds for example. At 42, the preferred DSS 10-P receives and processes the TTL request. It records its own local time, updates a projection of the TTL expiration time, and sends a message back to the non-preferred DSS 10-NP granting the new TTL. Additional details of this operation are given below. At 44 the non-preferred DSS 10-NP receives the grant message and uses it to update/refresh its own local TTL. This process iterates at regular intervals (e.g., one second) as indicated at Next 46.

Each of the DSSs 10 maintains a TTL expiration time, which is periodically refreshed and used in conjunction with a system time-of-day (TOD) to monitor for expiration of TTL. Whenever the TOD value is higher than the expiration time, it means TTL has expired and the DSS 10 initiates polarization. From time to time the "TTL expiration time" is updated (via TTL requests). Thus, under normal circumstances the "TTL expiration time" is always in the future, and as the TOD clocks is ticking, TTL updates keep moving the TTL expiration time ahead so that it stays in the future. If TTL updates stop, due to a failure, eventually the TOD clock progresses past the TTL expiration timer and polarization will be triggered.

The preferred DSS 10-uses its TTL expiration timer to track its projection of the expiration of the TTL timer at the non-preferred DSS 10-NP. When a failure occurs (which may be intermittent), TTL grant requests (or responses) are not being transferred on the link 24, and one or both arrays 10 see their TTL timer expiring. When an array timer expires, the array 10 stops servicing I/O requests and starts queuing them instead, while also invoking the polarization process to resolve which of the two arrays 10 should survive. The TTL mechanism alone would dictate that only the preferred DSS 10-P should survive, if any. However, additional functionality involving the witness node 18 can result in the non-preferred DSS 10-NP surviving in some cases, as explained more below. If only one of the arrays 10 has connectivity to the witness node 18, it's a strong indication that the other DSS 10 has been isolated (e.g., in a data center failure), and the DSS 10 with the intact witness connectivity should prevail even if it is the non-preferred DSS 10-NP. If both DSSs 10 have connectivity to the witness node 18, the preferred DSS 10-P should be preferred to win.

Figure 3:
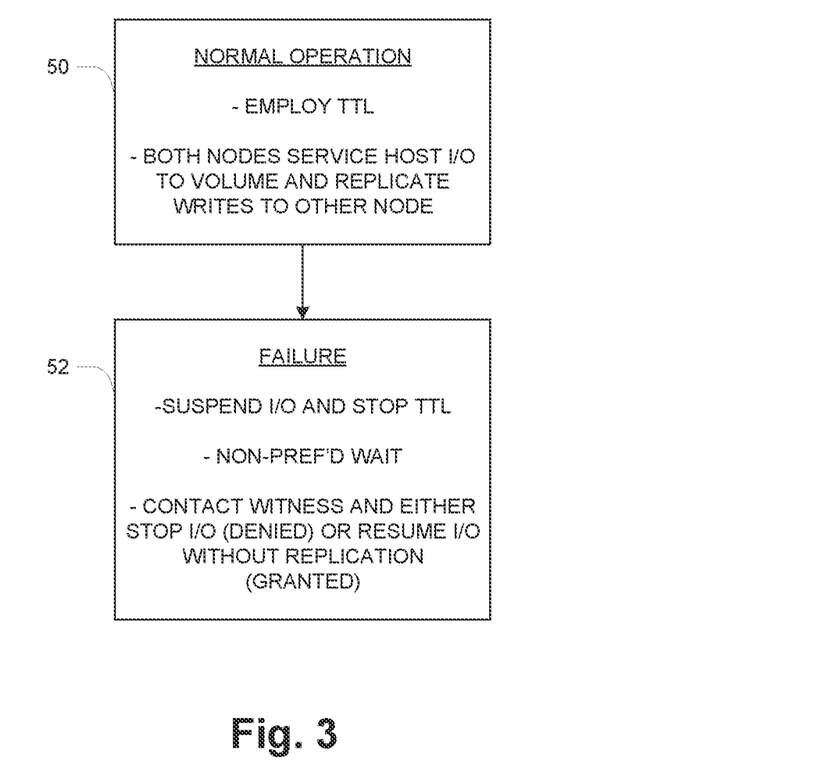
FIG. 3 is a simplified flow diagram of overall operation of a data storage system using the TTL mechanism as well as interaction with a separate witness node to avoid so-called "split brain" condition and data corruption.

FIG. 3 illustrates overall operation of a DSS 10 in pertinent part. Operation of the two nodes 10-P and 10-NP is essentially the same except for their asymmetric TTL roles and an additional delay used by the non-preferred node 10-NP, explained more fully below.

At 50, normal operation occurs in which the DSS 10 employs a time-to-live (TTL) mechanism by which a preferred node 10 of a clustered pair regularly communicates permission for continued operation to a non-preferred node of the clustered pair in response to regular TTL requests therefrom. It will be understood that the use of the TTL mechanism differs between the preferred and non-preferred nodes 10-P, 10-NP accordingly, and as described above. Also at 50, assuming regular non-errored operation of the TTL mechanism, both DSSs 10 service host I/O requests to the volume 26 and replicate write-type requests to the other DSS 10 of the pair, in order to maintain synchronization of the local copies of the volume 26.

At 52, a node detects a failure of replication, which may be indicated by errored operation of the TTL mechanism, and performs a polarization operation to select a surviving node 10 to transition to single-node access to the volume 26. "Errored" operation refers to the situation in which the TTL timer at either/both the DSSs 10 reach zero. The polarization process includes:

(1) Suspending the servicing of the host I/O requests and stopping TTL operation (withholding requests and grants). Host I/O requests may be queued for processing after completion of polarization.

(2) The preferred DSS 10-P proceeds to contact the witness node 18 immediately, while the non-preferred DSS 10-NP waits a predetermined additional amount to give the preferred DSS 10-P a chance to contact the witness node 18 first and obtain survivor status.

(3) At each of the nodes 10, the witness node 18 is contacted to request survivor status. The witness node grants survivor status to the first node 10 requesting it, and denies the survivor status to a later-requesting node 10. Because of the additional delay for the non-preferred DSS 10-NP, the process favors the survival of the preferred DSS 10-P if it is still alive and able to contact the witness node 18.

(4) The node 10 granted survivor status continues to service host I/O requests to the volume 26 without replicating write-type requests to the other node 10.

(5) The other node, based on being denied survivor status, discontinues servicing of host I/O requests to the volume 26.

It will be appreciated that using the above scheme, there are conditions in which the non-preferred DSS 10-NP receives survivor status and continues operation, to the exclusion of the preferred DSS 10-P. This can occur, for example, if the preferred DSS 10-P completely fails and is unable to contact the witness node 18, in which case the non-preferred DSS 10-NP is the first to contact the witness node 18 and thus becomes the survivor. It will also be appreciated that the technique is biased in favor of the preferred DSS 10-P becoming the survivor, as there are multiple failure scenarios in which the preferred DSS 10-P is either the first or the only DSS 10 to contact the witness node 18.

Figure 4:
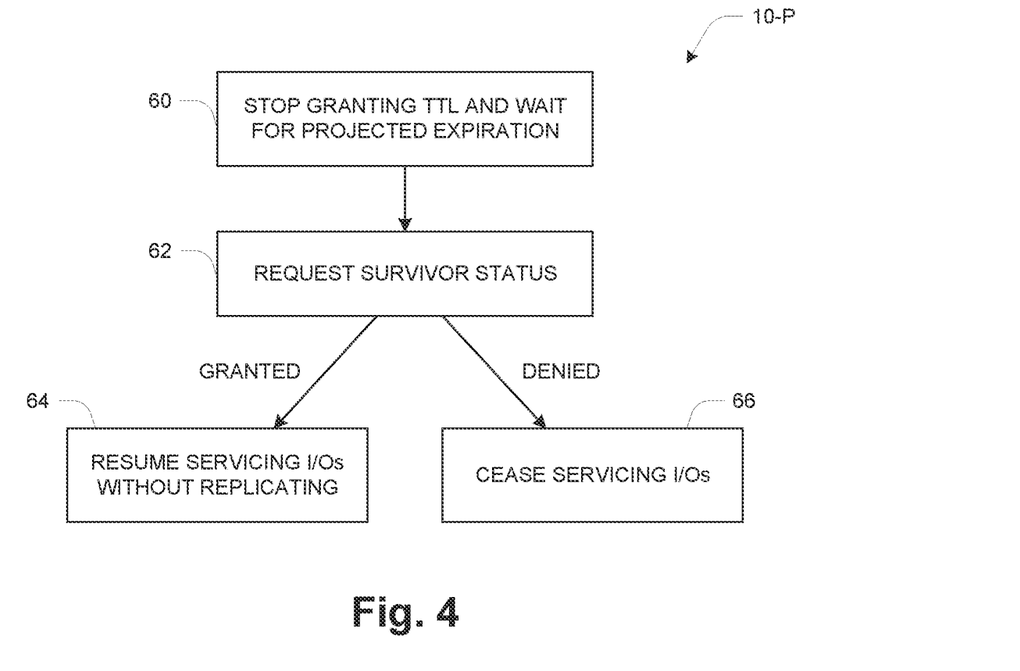
FIG. 4 is a flow diagram of specific operation of a preferred data storage system.
Figure 5:
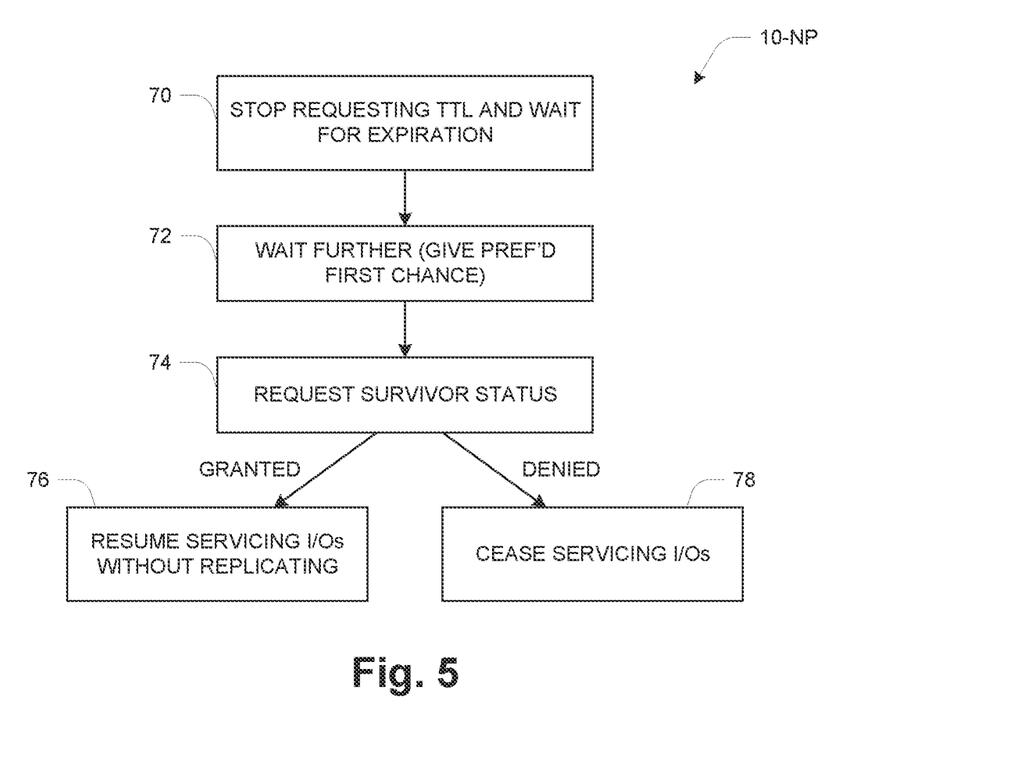
FIG. 5 is a flow diagram of specific operation of a non-preferred data storage system.

For clarity, it is emphasized that active/active replication failure can stem from either TTL failure or a failure to replicate a write request. This description employs the term "replication" to refer to the active/active mechanism, and in this case there are the types of following failures that cause polarization:

1. Inability to replicate a host write within a specified time window
2. Inability to get timely response to TTL requests, resulting in expiration of the TTL timer FIGS. 4 and 5 illustrate the respective algorithms employed at the preferred node 10-P and the non-preferred node 10-NP in some additional detail. These are described in turn.

FIG. 4—Algorithm at Preferred DSS 10-P

If the preferred DSS 10-P cannot replicate or if it notices that the non-preferred DSS 10-NP is out of TTL (timer expires), it attempts a polarization process. During the process, all host I/Os are queued. The process can take up to a few seconds (for example, 10 seconds), well within a SCSI I/O timeout. At the end of the process, the preferred DSS 10-P is either "down" (does not survive) or it is the sole winner and continues to service I/O, resuming all queued I/Os. The process at the preferred node 10-P includes:

1. At 60, stop granting TTL and wait until the non-preferred DSS 10-NP is out of TTL (use expiration timer).

2. At 62, send a request to the witness node 18 asking for survivor status. Assuming it is functional, the witness node 18 responds immediately with a response indicating either grant/approval or rejection/denial:

At 64, in response to witness node approval (grant), the preferred DSS 10-P becomes the surviving DSS 10 and resumes servicing the host I/Os (including any that were queued during the polarization process) without replicating writes to the other (non-preferred) DSS 10. Ongoing operation using only one DSS 10 is referred to as a "fractured" state of volume access.

At 66, in response to witness node rejection (denial), the preferred DSS 10-P rejects all I/Os (including those previously queued) and sets path information to indicate that the volume 26 is inaccessible at the DSS 10-P.

Algorithm at Non-Preferred DSS 10-NP (FIG. 5)

If the non-preferred DSS 10-NP cannot replicate a write or its TTL time expired, it starts the polarization process. During the process, all host I/Os are queued. At the end of the process, the non-preferred DSS 10-NP is either "down" (does not survive) or it is the sole winner and continues to service I/O, resuming all queued I/Os. The process at the non-preferred node 10-P includes:

1. At 70, stop requesting TTL and wait for expiration of the local TTL timer. This delay is to allow time for the tracking timer (projection) at the preferred DSS 10-P to expire. This delay may be increased (e.g., by one second) to account for messaging delays as may be needed.

2. At 72, wait further (e.g., 3 additional seconds) to give the preferred DSS 10-P a chance to contact the witness node 18 first.

3. At 74, send a request to the witness node 18 asking for survivor status. Assuming it is functional, the witness node 18 responds immediately with a response indicating either grant/approval or rejection/denial:

At 76, in response to witness node approval (grant), the non-preferred DSS 10-NP becomes the surviving DSS 10 and resumes servicing the host I/Os (including any that were queued during the polarization process) without replicating writes to the other (preferred) DSS 10. Ongoing operation using only one DSS 10 is referred to as a "fractured" state of volume access.

At 78, in response to witness node rejection (denial), the non-preferred DSS 10-NP rejects all I/Os (including those previously queued) and sets path information to indicate that the volume 26 is inaccessible at the DSS 10-NP.

Figure 6:
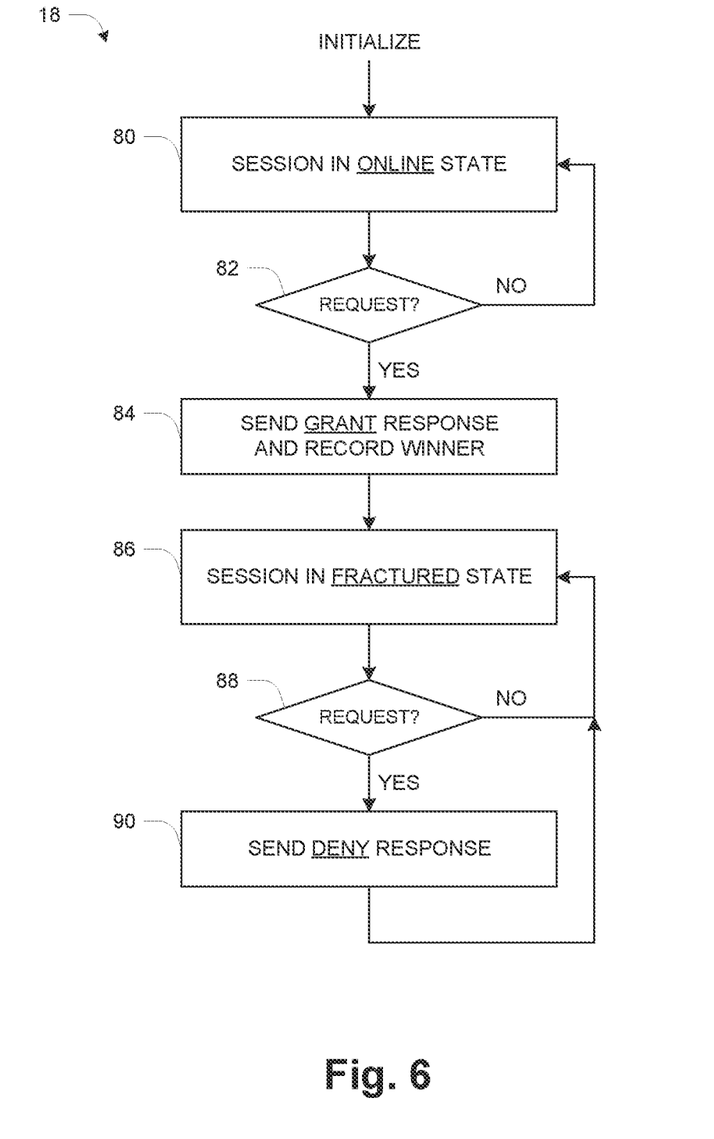
FIG. 6 is a flow diagram of specific operation of the witness node.

FIG. 6 illustrates operation of the witness node 18. As shown at 80, upon initialization, it establishes a unique session for the two DSSs 10 and volume 26, and sets the session state to Online, indicating that both DSSs 10 are providing access and replicating writes to the other DSS 10. The session may be identified by a corresponding session number.

At 82, the witness node 18 checks for receipt of a request for survivor status and, upon receiving one, proceeds to step 84. As long as no requests are received, the session remains in the online state at 80 as indicated by the No branch at 82. A request received at 82 is necessarily a first request from a first-requesting DSS 10, which will result in that DSS being granted the survivor status, which is indicated at 84—sending a Grant response (to notify the requesting DSS 10 of the grant) and recording the identity of the requesting DSS 10 as the winner, i.e., survivor.

At 86, operation continues in the Fractured state, i.e., with only one DSS 10 providing access and with no replicating of write requests (so-called degraded writes). At 88 the witness node 18 checks for receipt of a request for survivor status and, upon receiving one, proceeds to step 90 where it sends a Deny response to notify the requesting DSS 10 that its request is denied. The session remains in the Fractured state at 86, and any additional requests are processed in the same manner.

The system will typically have a mechanism for resetting the witness node state to the Online state 80 when a failure has been corrected and both DSSs 10 are again capable of replicating their write requests to each other and to engage in a TTL exchange 30. This resetting mechanism may employ a human or AI manager issuing a management operation to the witness node 18 to perform such a reset. In other cases, the existing session may be deleted and a new one formed in its stead, for example if a failed DSS 10 is completely replaced by another one to form a new clustered pair providing access to the volume 26.

Note Regarding Clock Synchronization

It should be noted that the technique described herein requires some degree of clock synchronization between the two DSSs 10. As noted above, the non-preferred DSS 10-NP uses a delay based on an assumption that it gives the preferred DSS 10-P sufficient time to start polarization and become the survivor. It is important that this assumption be valid. In general, however, a TTL request from the non-preferred DSS 10-NP can be delayed by the network. There is thus a risk that the non-preferred DSS 10-NP goes through polarization and is given survivor status while the preferred DSS 10-P never noticed any issue—from its point of view, the non-preferred DSS 10-NP still has TTL.

To solve this issue, the two DSSs 10 preferably maintain independent but highly accurate clocks, i.e., clocks that have at least millisecond granularity and that do not drift by more than a few ms every day. They also use a clock synchronization protocol to calculate an upper bound on the gap between the clocks. The gap may be on the order of magnitude of a link roundtrip (for example, 10 ms). The two sides can update it infrequently, for example, once an hour. Also, to help avoid the above situation, TTL requests may include a timestamp, and the preferred DSS 10-P rejects any TTL request older than some threshold, e.g., 500 ms.

While various embodiments of the invention have been particularly shown and described, it will be understood by those skilled in the art that various changes in form and details may be made therein without departing from the scope of the invention as defined by the appended claims.

What is claimed is:

1. A method of operating a clustered pair of data storage nodes, comprising:
    employing a time-to-live (TTL) mechanism by which a preferred node of the clustered pair regularly communicates permission for continued operation to a non-preferred node of the clustered pair in response to regular TTL requests therefrom;
    at both the preferred node and the non-preferred node during non-errored operation of the TTL mechanism, servicing host I/O requests to a data storage object and, for write-type requests, replicating the write-type requests to the other node of the clustered pair; and
    detecting a failure as indicated by errored operation of the TTL mechanism or by failure of replicating the write-type requests, and performing a polarization operation to select a surviving node to transition to single-node access to the data storage object, the polarization process including: (1) at each of the nodes, contacting a third witness node to request survivor status, (2) at the witness node, granting survivor status to the first node requesting it and denying survivor status to a later-requesting node, (3) at the node granted survivor status, continuing to service host I/O requests to the data storage object without replicating write-type requests to the other node, and (4) at the other node, discontinuing servicing of host I/O requests to the data storage object.

2. The method according to claim 1, wherein the TTL mechanism includes a TTL timer at the non-preferred node which is refreshed by each grant of TTL permission from the preferred node, and a corresponding tracking timer at the preferred node which tracks operation of the TTL timer, and wherein the non-errored operation includes regular refreshing of the TTL timer by each grant of TTL permission before the TTL timer expires, and wherein the errored operation includes expiration of the TTL timer.

3. The method according to claim 2, wherein the errored operation results from an absence of grant of TTL permission from the preferred node notwithstanding a corresponding request of TTL from the non-preferred node that would normally result in a grant of TTL permission being sent.

4. The method according to claim 3, wherein the failure condition is such that the preferred node is unable to send the grant of TTL permission.

5. The method according to claim 3, wherein the failure condition includes failure of replicating a write request from the preferred node to the non-preferred node, and the absence of the grant of TTL permission is the intentional withholding of the grant by the preferred node in order to initiate the polarization operation.

6. The method according to claim 2, wherein the errored operation results from an absence of grant of TTL permission from the preferred node due to absence of a preceding request of TTL from the non-preferred node that would normally result in a grant of TTL permission being sent.

7. The method according to claim 6, wherein the failure condition is such that the non-preferred node is unable to send the request of TTL.

8. The method according to claim 6, wherein the failure condition includes failure of replicating a write request from the non-preferred node to the preferred node, and the absence of the TTL request is the intentional withholding of the TTL request by the non-preferred node in order to initiate the polarization operation.

9. The method according to claim 1, wherein the TTL mechanism includes use of an additional delay by the non-preferred node to provide a chance to the preferred node to be the first to contact the witness node and thereby obtain survivor status.

10. The method according to claim 1, wherein the polarization operation at each node further includes queueing new host I/O requests, and (1) at the node granted survivor status, processing the queued host I/O requests as part of continuing to service host I/O requests, and (2) at the node denied survivor status, rejecting the queued host I/O requests.

11. The method according to claim 1, wherein the node granted survivor status is the preferred node, and wherein the other node is the non-preferred node and discontinues servicing of host I/O requests based on being denied survivor status by the witness node.

12. The method according to claim 1, wherein the node granted survivor status is the preferred node, and wherein the other node is the non-preferred node and discontinues servicing of host I/O requests based on expiration of its operating permission as indicated by the TTL mechanism.

13. The method according to claim 1, wherein the node granted survivor status is the non-preferred node, and wherein the other node is the preferred node and discontinues servicing of host I/O requests based on being denied survivor status by the witness node.

14. A data storage node usable in a clustered pair of data storage nodes including a preferred node and a non-preferred node, the data storage node comprising a storage processor and physical storage, the storage processor storing computer program instructions executable by the storage processor to cause the data storage node to operate by:

employing a time-to-live (TTL) mechanism by which the preferred node regularly communicates permission for continued operation to the non-preferred node of the clustered pair in response to regular TTL requests therefrom;

during non-errored operation of the TTL mechanism, servicing host I/O requests to a data storage object and, for write-type requests, replicating the write-type requests to the other node of the clustered pair; and detecting a failure as indicated by errored operation of the TTL mechanism or by failure of replicating the write-type requests, and performing a polarization operation to select a surviving node to transition to single-node access to the data storage object, the polarization process including: (1) contacting a third witness node to request survivor status, the witness node being configured and operable to grant survivor status to the first node requesting it and deny survivor status to a later-requesting node, (2) in response to being granted survivor status, continuing to service host I/O requests to the data storage object without replicating write-type requests to the other node, and (3) in response to being denied survivor status, discontinuing servicing of host I/O requests to the data storage object.

15. The data storage node according to claim 14, configured for operation as the preferred node.

16. The data storage node according to claim 14, configured for operation as the non-preferred node.

* * * * *